United States Patent
Lee

(10) Patent No.: US 8,798,237 B2
(45) Date of Patent: Aug. 5, 2014

(54) VOICE DIALING METHOD AND APPARATUS FOR MOBILE PHONE

(75) Inventor: Hyung Chul Lee, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 1897 days.

(21) Appl. No.: 12/055,788

(22) Filed: Mar. 26, 2008

(65) Prior Publication Data
US 2008/0240377 A1 Oct. 2, 2008

(30) Foreign Application Priority Data
Mar. 30, 2007 (KR) ........................ 10-2007-0031398

(51) Int. Cl.
*H04M 1/64* (2006.01)

(52) U.S. Cl.
USPC ..................... 379/88.03; 379/88.04

(58) Field of Classification Search
CPC ...... H04M 2201/40; H04M 2242/22; H04M 3/42059; H04M 2201/38; H04M 1/7255
USPC .......... 379/88.01–88.04, 88.08, 88.11, 88.14, 379/93.15, 289
See application file for complete search history.

(56) References Cited

U.S. PATENT DOCUMENTS

| | | | |
|---|---|---|---|
| 5,805,672 A * | 9/1998 | Barkat et al. | 379/88.03 |
| 5,912,949 A | 6/1999 | Chan et al. | |
| 6,157,844 A * | 12/2000 | Doran et al. | 455/552.1 |
| 6,226,532 B1 * | 5/2001 | Kim et al. | 455/563 |
| 6,263,216 B1 * | 7/2001 | Seydoux et al. | 455/564 |
| 6,393,304 B1 * | 5/2002 | Meche | 455/563 |
| 6,418,328 B1 * | 7/2002 | Shon | 455/563 |
| 6,526,292 B1 * | 2/2003 | Henry, Jr. | 455/563 |
| 6,529,747 B1 * | 3/2003 | Toba | 455/563 |
| 6,584,439 B1 * | 6/2003 | Geilhufe et al. | 704/270 |
| 6,697,455 B2 * | 2/2004 | Krofchalk | 379/88.03 |
| 6,785,366 B1 * | 8/2004 | Nobuta et al. | 379/88.03 |
| 6,788,767 B2 * | 9/2004 | Lambke | 379/88.01 |
| 6,845,251 B2 * | 1/2005 | Everhart et al. | 455/563 |
| 6,868,142 B2 * | 3/2005 | Gupta et al. | 379/88.04 |
| 6,965,665 B2 * | 11/2005 | Fan et al. | 379/88.16 |
| 7,050,550 B2 * | 5/2006 | Steinbiss et al. | 379/88.01 |
| 7,050,563 B2 * | 5/2006 | Dammrose | 379/229 |
| 7,152,213 B2 | 12/2006 | Pu et al. | |
| 7,164,934 B2 * | 1/2007 | Malizia-Hoyt et al. | 455/563 |
| 7,177,670 B2 * | 2/2007 | Yoon | 455/569.1 |
| 7,181,399 B1 | 2/2007 | Rahim et al. | |
| 7,260,187 B1 * | 8/2007 | McAllister | 379/88.04 |
| 7,340,041 B2 * | 3/2008 | Otagaki et al. | 379/88.01 |
| 7,526,279 B1 * | 4/2009 | Fujisaki | 455/414.1 |
| 7,532,879 B1 * | 5/2009 | Fujisaki | 455/414.1 |
| 7,542,787 B2 * | 6/2009 | Zhang et al. | 455/569.1 |
| 7,778,664 B1 * | 8/2010 | Fujisaki | 455/556.1 |

(Continued)

FOREIGN PATENT DOCUMENTS

| | | |
|---|---|---|
| EP | 1 110 207 | 9/1999 |
| KR | 1020030084456 | 11/2003 |
| KR | 1020050098349 | 10/2005 |

*Primary Examiner* — Fan Tsang
*Assistant Examiner* — Akelaw Teshale
(74) *Attorney, Agent, or Firm* — The Farrell Law Firm, P.C.

(57) ABSTRACT

A voice dialing method and apparatus for simplifying voice dial is provided. The voice dialing method includes receiving a speech in a voice recognition mode, extracting characters from the speech, translating the characters into corresponding numerals, and dialing a phone number on the basis of the numerals.

11 Claims, 3 Drawing Sheets

(56) References Cited

U.S. PATENT DOCUMENTS

| | | | |
|---|---|---|---|
| 7,801,283 B2 * | 9/2010 | Harwood et al. | 379/88.03 |
| 7,853,295 B1 * | 12/2010 | Fujisaki | 455/566 |
| 7,856,248 B1 * | 12/2010 | Fujisaki | 455/556.1 |
| 7,865,216 B1 * | 1/2011 | Fujisaki | 455/566 |
| 7,890,136 B1 * | 2/2011 | Fujisaki | 455/556.1 |
| 7,904,109 B1 * | 3/2011 | Fujisaki | 455/550.1 |
| 7,907,942 B1 * | 3/2011 | Fujisaki | 455/419 |
| 7,945,256 B1 * | 5/2011 | Fujisaki | 455/420 |
| 7,945,286 B1 * | 5/2011 | Fujisaki | 455/556.1 |
| 7,945,287 B1 * | 5/2011 | Fujisaki | 455/556.1 |
| 7,949,371 B1 * | 5/2011 | Fujisaki | 455/556.1 |
| 7,996,037 B1 * | 8/2011 | Fujisaki | 455/556.1 |
| 7,996,038 B1 * | 8/2011 | Fujisaki | 455/556.1 |
| 8,010,157 B1 * | 8/2011 | Fujisaki | 455/556.1 |
| 8,024,009 B1 * | 9/2011 | Fujisaki | 455/566 |
| 2004/0015354 A1 | 1/2004 | Miyauchi et al. | |
| 2004/0058672 A1 * | 3/2004 | Lee et al. | 455/412.1 |
| 2004/0176138 A1 | 9/2004 | Malizia-Hoyt et al. | |
| 2005/0288063 A1 * | 12/2005 | Seo et al. | 455/563 |
| 2007/0286398 A1 * | 12/2007 | Ramamoorthy et al. | 379/355.02 |
| 2008/0144788 A1 * | 6/2008 | You et al. | 379/93.15 |

* cited by examiner

VOICE DIALING METHOD AND APPARATUS FOR MOBILE PHONE

PRIORITY

This application claims priority to an application entitled "VOICE DIALING METHOD AND APPARATUS FOR MOBILE PHONE" filed in the Korean Intellectual Property Office on Mar. 30, 2007 and assigned Serial No. 2007-0031398, the contents of which are incorporated herein by reference.

BACKGROUND OF THE INVENTION

1. Field of the Invention

The present invention relates to a mobile phone and, in particular, to a voice dialing method and apparatus for a mobile phone that allows a user to conveniently voice dial with a number.

2. Description of the Related Art

With the advance of mobile and computing technologies, mobile phones are becoming very powerful and dominant devices for mobile computing. Lately, the mobile phones have evolved into mobile multifunction terminals with the incorporation of various multimedia functions such as messaging functions including Short Message Service (SMS) and Multimedia Messaging Service (MMS), visual communication, Internet access functions, etc.

A variety of convenient functions have also been adapted to the mobile phones for satisfying the user requirements. Among them the voice recognition-based dialing is one of the useful functions, with which the mobile phone retrieves a phone number within a phonebook using the voice recognition technology.

Voice recognition is the technology by which words or phrases spoken by humans are converted into electrical signals., These electrical signals are transformed into coding patterns to which meaning has been assigned. The voice dialing is achieved by retrieving the phone number corresponding to the meaning of the electrical signal from the phonebook and automatically dialing the retrieved phone number.

Conventional voice dialing functions insuch a manner that the mobile phone retrieves a phone number registered with features of a speech recorded by the user.

Typically, the voice dialing can be implemented with a name dial function and digit dial function.

The name dial function retrieves from the phonebook a phone number matched with a name or nick name and dials the retrieved phone number. Similarly, the digit dial function recognizes the audio input digits and dials the corresponding phone number.

However, the conventional name dial technique requires the user to remember the name or nickname registered to the phonebook in order to place a call. The user may be inconvenienced when the registered name or nickname does not readily come across.

The conventional name dial technique is useful only when the user remembers all digits of a phone number to place a call. Likewise, the conventional digit dial technique takes relatively long time to receive input speech and recognize the digits from the speech and is required to maintain a storage-consuming voice-phone number mapping table.

SUMMARY OF THE INVENTION

The present invention solves the above problems. The present invention provides an improved voice dialing method and apparatus that are capable of dialing a retrieved phone number on the basis of simplified speech input.

The present invention also provides a voice dialing method and apparatus that are capable of improving user convenience by recognizing a phone number from a word or phrase in voice speech.

The present invention also provides a voice dialing method and apparatus that are capable of improving recognition accuracy by separating a received speech into independent phonemes and converting the phonemes into digits constituting a phone number.

In accordance with an aspect of the present invention, a voice dialing method for a mobile phone includes receiving a speech in a voice recognition mode; extracting characters from the speech; translating the characters into corresponding numerals; and dialing a phone number on the basis of the numerals.

In accordance with another aspect of the present invention, a voice dialing method for a mobile phone includes receiving a speech in a voice recognition mode; searching the phonebook for a word or phone number corresponding to the input audio; extracting characters from the audio if the word or phone number is not retrieved; translating the characters into corresponding numerals; and dialing a phone number on the basis of the numerals.

In accordance with another aspect of the present invention, a voice recognition-enabled mobile phone includes an audio processing unit for processing a speech input through a microphone; a memory unit for storing a phonebook, a mapping table listing characters matched with numerals, and a voice dialing application; and a control unit for translating the speech into a sequence of numerals with reference to the mapping table and dialing a phone number on the basis of the sequence of numerals.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Figure 1:
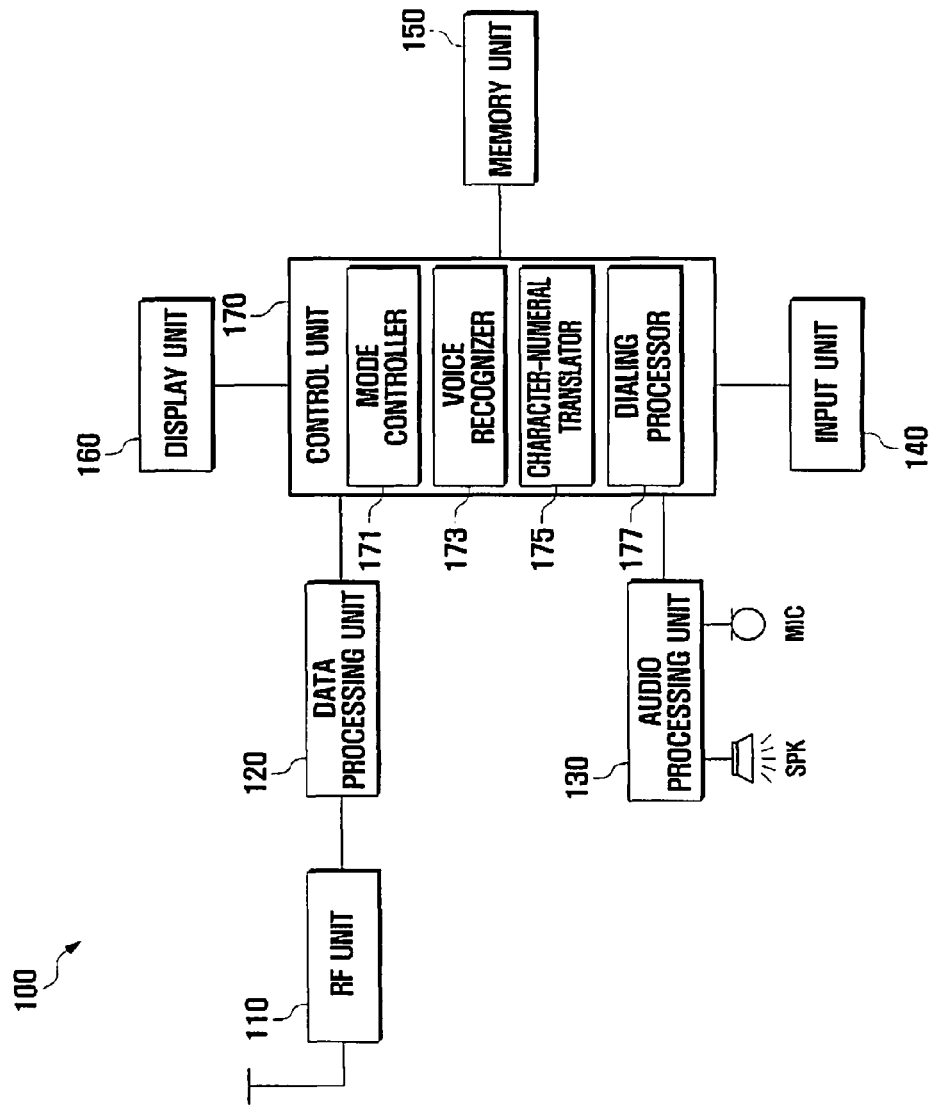
FIG. 1 is a block diagram illustrating a mobile phone adopting a voice dialing method according to the present invention.

Preferred embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Certain terms are used in the following description for convenience and reference only and are not thus limited. In the following detailed descriptions, only the preferred embodiments of the invention have been shown and described by way of illustration of the best mode of carrying out the invention as contemplated by the inventors. As will be realized, the invention is capable of modification in various obvious respects, all without departing from the spirit of the invention. Accordingly, the drawings and descriptions are to be regarded as illustrative in nature and not restrictive.

The present invention provides an improved voice dialing method. In the following embodiments, the voice dialing method is implemented with a voice recognition technology with which decomposes a user's speech into sound components mapped to the Arabic numerals that constitute a phone number.

For example, the voice dialing is performed by analyzing the combination of each sound of the alphabet characters corresponding to the numerals of the digits constituting a phone number rather than by recognizing the name or phone number itself.

In addition to the known name and digit dialing modes, the voice dialing method of the present invention provides a character dialing mode in which the voice recognition module of the mobile phone analyzes an input audio and recognizes the characters extracted from the audio as numerals so as to call the matched phone number including the sequence of numerals. That is, the voice dialing method of the present invention supports a character dialing mode.

Accordingly, the mobile phone adopting the voice dialing method according to an embodiment of the present invention is equipped with a voice recognition engine that is capable of decomposing the user speech into characters and converts the characters into corresponding numerals.

Assuming that a user speaks a word "help", the mobile phone searches for a phone number mapped to the word "help" in the name dialing mode in its phonebook, at first. If the word "help" is not retrieved in the phonebook, the mobile phone decomposes the input audio into characters H, E, L, and P and matches the string of the characters to predetermined numerals. If the characters H, E, L, and P are matched with the numerals 4, 3, 5, and 7, respectively, the mobile phone recognizes the sequence of 4357 as a target phone number.

The digital dialing and character dialing concepts are comparatively described hereinafter with reference to Tables 1 and 2.

TABLE 1

| Input audio | Number |
| --- | --- |
| "ZERO" | "0" |
| "ONE" | "1" |
| . | . |
| . | . |
| . | . |
| "EIGHT" | "8" |
| "NINE" | "9" |
| . | . |
| . | . |
| . | . |
| "TWELVE" | "12" |
| . | . |
| . | . |
| . | . |
| "THOUSAND" | "1000" |
| "DOUBLE (N)" | "(NN)" |
| "TRIPLE (N)" | "(NNN)" |
| . | . |
| . | . |
| . | . |

Table 1 is an exemplary digit mapping table for use in the digit dial mode. As shown in Table 1, the numerals and numeral sequences are mapped to representative words such that each numeral or numeral sequence can be input by voice. For example, a target phone number 555-4567 can be dialed by sequentially speaking "five, five, five, four, five, six, seven" or speaking "triple five, four, five, six, seven."

In the name dial mode, speaking a name or a word registered in the phone book can perform dialing. For example, if the home phone number "555-4567" is registered with the word "my home" in the phonebook, dialing home can be achieved by speaking "my home."

As described above, the user should remember the name or word corresponding to the target phone number registered to the phonebook in the name dial mode or should remember all digits of the phone number in the digit dial mode.

Unlike the name dial mode and digit dial mode, in the character dial mode, speaking a catchy word or character sequence can perform dialing.

Accordingly, in order to dial a phone number it is only required to remember the catchy word whose characters correspond to the sequence of digits of the phone number. Since the catchy word is made up by combining the characters placed on the keys together with the alphabet characters, it is possible to easily dial the phone number without registering a name or nickname in the phonebook.

Typically, the keypad of the mobile phone is provided with a plurality of alphanumeric keys each having a numeral with at least one character.

TABLE 2

| Character | Numeral |
| --- | --- |
| "A" | "1" |
| "B", "C" | "2" |
| "D", "E", "F" | "3" |
| "G", "H", "I" | "4" |
| "J", "K", "L" | "5" |
| "M", "N", "O" | "6" |
| "P", "Q", "R", "S" | "7" |
| "T", "U", "V" | "8" |
| "W", "X", "Y" | "9" |
| "Z" | "0" |

Table 2 is an exemplary character-numeral table for use in the character dial mode of the voice dialing method according to an exemplary embodiment of the present invention. The key arrangement is configured in the manufacturing phase of the mobile phone. Accordingly, there is no need to generate the character-numeral mapping table intentionally. However, the present invention is not limited to the fixed character-numeral table. For example, the user can reconfigure the key arrangement. Although the keys are provided with the English alphabets in table 2, it is obvious that the other characters can be assigned with corresponding numerals depending on language.

Referring to Table 2, dialing a phone number is made by speaking a catchy word composed by combining the characters placed on the keys with the partial or entire numerals of the phone number. For example, if the target phone number includes a sequence of numerals "4357", the user can dial the phone number by speaking the catchy word "HELP" of which H for 4, E for 3, L for 5, and P for 7.

That is, if the user speaks the word "HELP", the mobile phone recognizes and decomposes the word into independent characters H, E, L, and P and converts the character sequence "HELP" into a numeral sequence "4357." Sequentially, the mobile phone retrieves a phone number including the numeral sequence "4357" and places a call to the retrieved phone number in response to a user command.

Although the voice dialing method has been explained with the mobile phone in the above description, the voice dialing method of the present invention featuring the character dialing mode can be applied to various voice recognition application fields. For example, the character recognition feature of the voice dialing method can be applied to a file searching application for retrieving files of which the title is composed of numeral sequence corresponding to a character sequence extracted from a user speech. Particularly, the character recognition technique can be useful for searching for a multimedia file such as MP3 file.

Although the voice dialing method is explained with a mobile phone, the present invention is not limited thereto.

The mobile phone can be any of a Wideband Code Division Multiple Access (WCDMA) terminal; multimedia player including Portable Multimedia Player (PMP), MP3 player, and digital broadcast receiver; Personal Digital Assistant (PDA), Smartphone, and their equivalents.

Referring to FIG. 1, the mobile phone includes a radio frequency (RF) unit 110, a data processing unit 120, an audio processing unit 130, an input unit 140, a memory unit 150, a display unit 160, and a control unit 170. Control unit 170 includes a mode controller 171, a voice recognizer 173, a character translator 175, and a dialing processor 177.

RF unit 110 is responsible for radio communication of mobile phone 100. RF unit 110 establishes a radio channel with a radio access network, i.e. a base station, for voice and data communications. RF unit 110 includes an RF transmitter for up-converting and amplifying transmission signals and an RF receiver for low noise-amplifying and down-converting reception signals.

Data processing unit 12 is responsible for processing voice data received from audio processing unit 130, alphanumeric data input through input unit 140, and radio data received and to be transmitted through RF unit 110. Data processing unit 120 may include a modem and a codec. The codec includes at least one of audio, video, and data CODECs.

Audio processing unit 130 is responsible for processing audio data output by data processing unit 120 to be output through a speaker (SPK) in the form of audible sound and processing the audio signal input through a microphone (MIC) to be output to data processing unit 120.

Input unit 140 allows inputting alphanumeric data and function execution commands and transfers the input sequence to control unit 170. Input unit 140 is configured to distinguishably receive a voice dial mode activation/deactivation signal. Input unit 140 can be implemented with at least one of a normal keypad, a QWERTY keypad, and touchpad depending on the mobile phone. Input unit 140 may be provided with navigation keys, volume key, and various hot keys.

Memory unit 150 stores application programs for executing various functions of the mobile phone and user data generated while operating the application programs or input by the user. The user data includes phonebook data, picture and audio files such as MP3 files. Particularly, the memory unit stores a voice recognition application for recognizing an input speech, and voice dialing application for placing a call with the recognized speech, a speech decomposition application for determining characters constituting the recognized speech, and a character-numeral translation application for translating a sequence of characters into a sequence of numerals. Memory unit 150 is provided with mapping tables such as Tables 1 and 2 for providing various voice dial modes. Memory unit 150 may be provided with at least one buffer for temporarily storing the user data generated during the operations of the applications.

Display unit 160 is responsible for displaying the application data played during the operations and user data generated in response to the user input. Particularly, display unit 160 is configured to display the numeral sequence matched with the character sequence obtained by decomposing the input speech. Display unit 160 can be implemented with a Liquid Crystal Display (LCD). If the LCD is provided with a touchscreen function, display unit 160 can be a part of input unit 140.

Control unit 170 controls general operations of mobile phone 100 and signaling between the internal elements. That is, control unit 170 controls the cooperative signal flows among data processing unit 120, audio processing unit 130, input unit 140, memory unit 150, and display unit 160. Control unit 170 can incorporate data processing unit 120.

Control unit 170 controls the activation/deactivation of the voice dial modes. Control unit 170 analyzes an input speech (word or character catchy word) and obtains a character sequence from the speech and converts the character sequence into a numeral sequence. The control unit retrieves a phone number including the numeral sequence. If a phone number is retrieved, control unit 170 places a call to the phone number in response to a user command.

In order to facilitate the voice dialing control, control unit 170 is provided with the mode controller, voice recognizer 173, character translator 175, and dialing processor 177.

Mode controller 171 configures the mobile phone with voice dial modes according to the user request or preset settings.

Voice recognizer 173 recognizes a speech input when the voice recognition mode is activated. The speech may be any of a word, a word sequence, a name, a nickname, and numeral sequence. Voice recognizer 173 is configured to recognize the respective alphabet characters of audio input.

Character translator 175 composes a sequence of numerals that are mapped to characters recognized by voice recognizer 173.

Dialing processor 177 places a call on the basis of the numeral sequence. Dialing processor 177 determines one of the name dial, digit dial, and character dial mode on the basis of the output of character translator 175. In the character dial mode, dialing processor 177 retrieves the phone number including the numeral sequence and then places a call to the retrieved phone number.

Although the voice dialing method has been described with a mobile phone 100 having the configuration of FIG. 1, the configuration of the mobile phone is not limited thereto. For example, the mobile phone can be provided with at least one of a camera module, a Bluetooth® module, and a digital broadcast receiver. Also, the mobile phone can be configured without any of internal elements depending on the type of communication system.

The operations of the above-structured mobile phone are described in association with the voice dialing method hereinafter in more detail.

Figure 2:
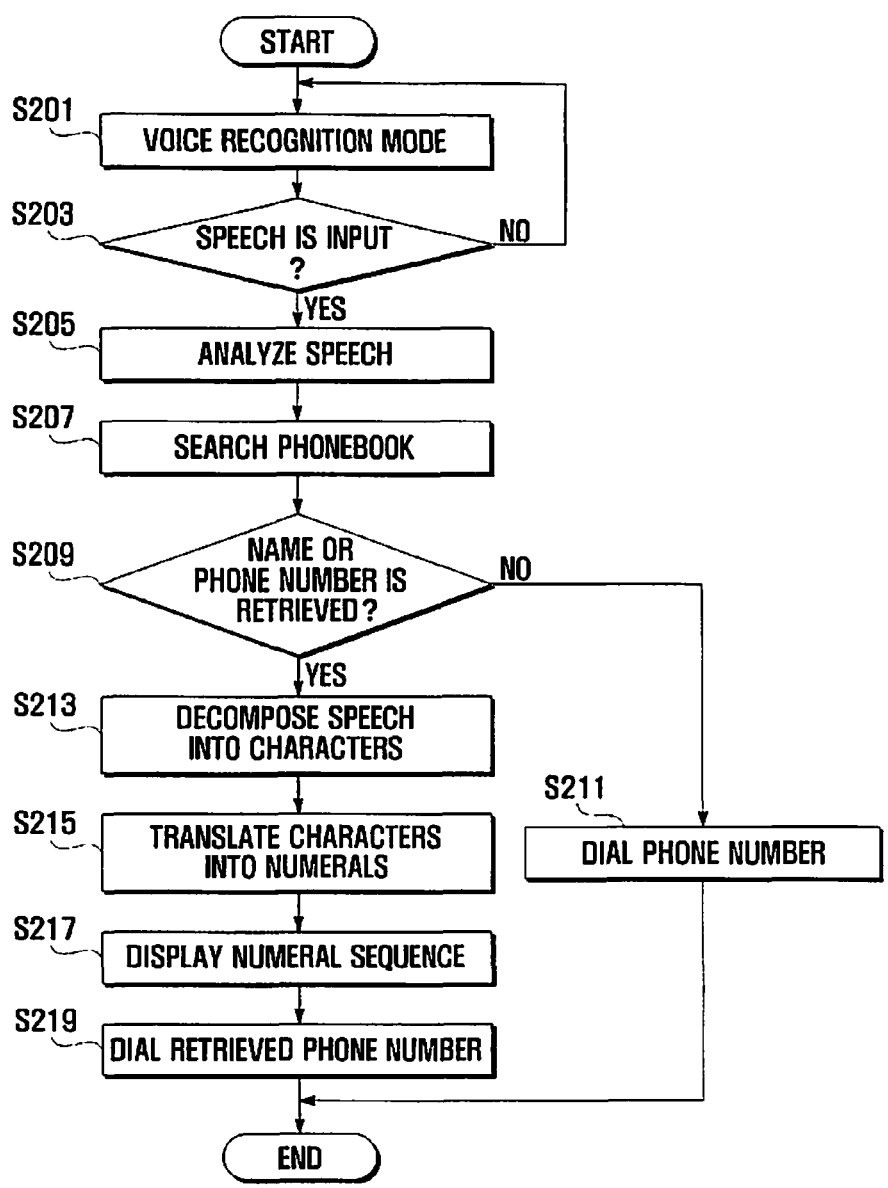
FIG. 2 is a flowchart of a voice dialing method according to the present invention.

Referring to FIG. 2, while the mobile phone operates in the voice recognition mode in step S201, the mobile phone monitors the input through the microphone (MIC) in step S203. The speech can be a word or a sequence of words representing a name or nickname, or a sequence of numerals.

If a speech is detected, the mobile phone analyzes the speech in step S205 and search for the word or numeral sequence corresponding to the input speech in the phone book in step S207. The mobile phone determines whether the word or numeral sequence is retrieved in the phonebook in step S209.

If the word or numeral sequence is retrieved in the phonebook, the mobile phone dials the phone number mapped to the word or corresponding to the numeral sequence in step S211.

If the word or numeral sequence is not retrieved, the mobile phone decomposes the speech into characters in step S213 and composes a sequence of numerals corresponding to the characters in step S215. Next, the mobile phone displays the numeral sequence on the display screen in step S217. If the sequence is confirmed as a user-intended numeral sequence, the mobile phone retrieves the phone number having the numeral sequence and dials the retrieved phone number in response to a user command in step S219.

Figure 3:
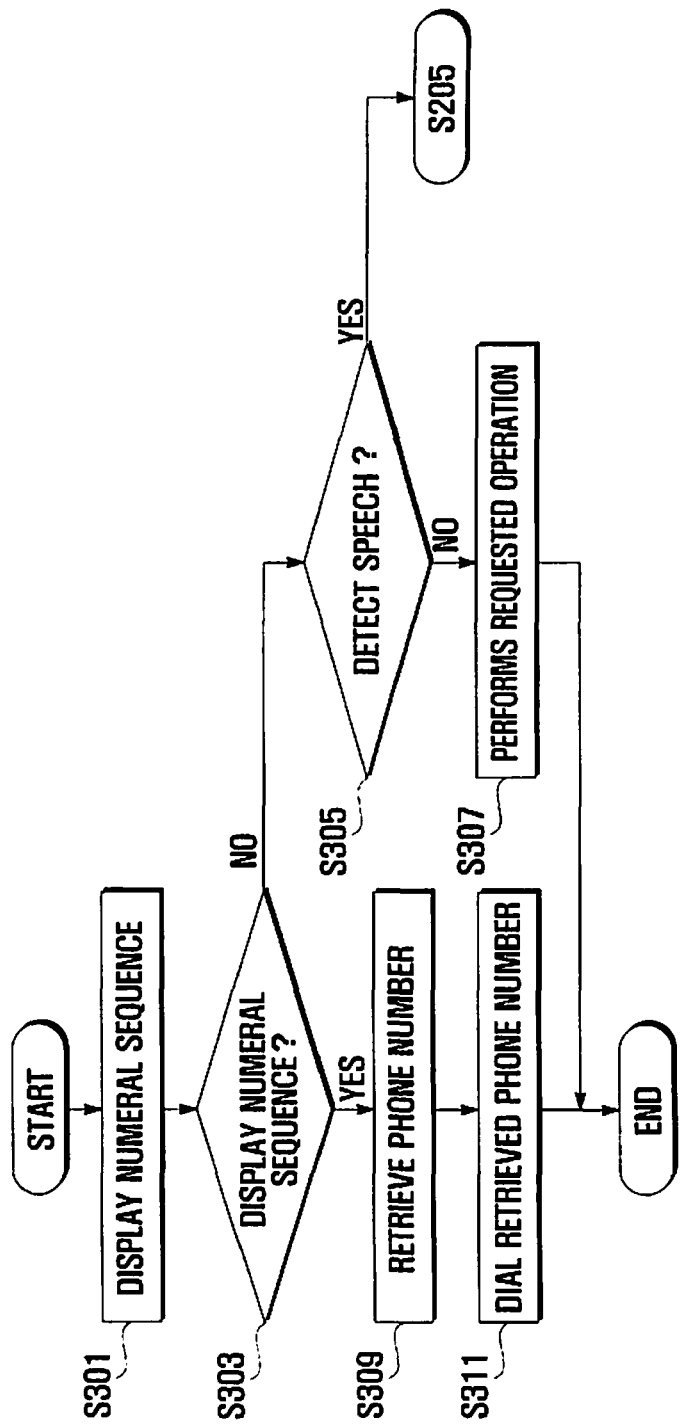
FIG. 3 is a flowchart of the dialing procedure of FIG. 2 in more detail.

Referring to FIG. 3, while the reference numeral is displayed on the display screen in step S301, the mobile phone determines if a key input for confirming the numeral sequence is a user intended sequence in step S303.

The key input is received in response to a popup message asking conformation on the numeral sequence. The mobile terminal determines, on the basis of the key input by the user, whether the numeral sequence is the intended one.

If it is determined that the numeral sequence is not the user-intended sequence, the mobile phone requests audio input of word or numeral sequence again and determines whether a speech is detected in step S305. If a speech is detected, the mobile phone performs step S205 of FIG. 2 again.

If it is determined a speech is not detected, the mobile phone performs a predetermined operation or other requested operation in step S307. For example, the mobile terminal may exit the voice dial mode or reanalyzes the previously input speech and retrieves another phone number.

Returning to step S303, if it is determined that the numeral sequence is the user-intended numeral sequence, the mobile phone retrieves a phone number including the numeral sequence from the phonebook in step S309. The mobile terminal loads the retrieved phone number and displays the phone number on the display screen. Consequentially, the mobile phone performs dialing the phone number in step S311.

Although not described in detail above, the phone number can be dialed directly via audio. In this case, the process for retrieving the phone number can be skipped.

In the above description, the voice dialing is described mainly with the spoken a word or phrase. However, voice dialing can be performed by sequentially speaking independent characters corresponding to the numerals.

Although the voice dialing method is explained with the 4 digit numeral sequence, the number of digits can be increased or decreased.

For example, the numeral sequence "17753" can be input by speaking the word "APPLE" for dialing a phone number including "17753." Also, the numeral sequence "663" can be input by speaking the word "ONE" for dialing a phone number including "663."

As described above, the voice dialing method and apparatus of the present invention are advantageous to dialing a phone number retrieved on the basis of simplified speech input. The phone number is retrieved from a phonebook by a sequence of numerals corresponding to a sequence of characters that are spoken independently or as a word, resulting in improved user convenience.

Also, the voice dialing method and apparatus of the present invention is advantageous since there is no need to remember the entire phone number or relatively long name or nickname for dialing the phone number.

Since a phone number is retrieved by speaking a word composed in combination of characters or speaking independent characters provided with numerals on the respective keys, the voice dialing can be made with a catchy word or a sequence of characters, resulting in improved user convenience.

Although exemplary embodiments of the present invention have been described in detail hereinabove, it should be clearly understood by those skilled in the present art that many variations and/or modifications of the basic inventive concepts herein taught may still fall within the spirit and scope of the present invention, as further defined by the appended claims.

What is claimed is:

1. A voice dialing method for a mobile phone comprising:
    receiving a speech in a voice recognition mode;
    decomposing a plurality of characters from the speech;
    translating each decomposed character of the plurality of characters into a corresponding numeral;
    displaying the corresponding numerals;
    retrieving, if the numerals are a user-intended numeral sequence, at least one of phone numbers corresponding to the numeral sequence from a phonebook;
    displaying the at least one of the retrieved phone numbers; and
    dialing a specific phone number selected from the displayed at least one of the retrieved phone numbers.

2. The voice dialing method of claim 1, wherein the speech is a word or a sequence of words spoken by a user.

3. A voice dialing method for a mobile phone, comprising:
    receiving a speech in a voice recognition mode;
    searching for a word or a numeral sequence corresponding to the speech in a phonebook;
    dialing, if the word or the numeral sequence is searched from the phonebook, a phone number corresponding to the word or the numeral sequence;
    decomposing, if the word or the numeral sequence is not searched from the phonebook, a plurality of characters from the speech;
    extracting a numeral corresponding to each character of the decomposed plurality of characters;
    displaying the extracted numerals;
    retrieving, if the extracted numerals are a user-intended sequence, at least one of phone numbers corresponding to the extracted numerals from the phonebook;
    displaying the at least one of the retrieved phone numbers; and
    dialing a specific phone number selected from the displayed at least one of the retrieved phone numbers.

4. The voice dialing method of claim 3, wherein the speech is a word or a sequence of words spoken by a user.

5. A voice recognition-enabled mobile phone comprising:
    an audio processing unit for processing a speech input through a microphone;
    a memory unit for storing a phonebook, a mapping table listing characters matched with numerals, and a voice dialing application; and
    a control unit for decomposing a plurality of characters from the speech, translating each character of the plurality of decomposed characters into a corresponding numeral with reference to the mapping table, displaying the corresponding numerals, retrieving at least one of phone numbers corresponding to the corresponding numerals from a phonebook when the numerals are a user-intended numeral sequence, displaying the at least one of the retrieved phone numbers, and dialing a specific phone number selected from the displayed at least one of the retrieved phone numbers.

6. The voice recognition-enabled mobile phone of claim 5, wherein the control unit comprises:
    a mode controller for selectively activating and deactivating voice dial modes according to a user request or preset configuration;

a voice recognizer for recognizing the speech and decomposing the speech into characters; and a character translator for translating a sequence of the characters into a sequence of numerals.

7. The voice recognition-enabled mobile phone of claim 6, wherein the control unit further comprises a dialing processor for retrieving the at least one of the phone numbers on the basis of the sequence of numerals.

8. The voice recognition-enabled mobile phone of claim 7, wherein the dialing processor retrieves the at least one of the phone numbers including the sequence of numerals and dials the specific phone number in response to a user request.

9. The voice recognition-enabled mobile phone of claim 5, wherein the voice dialing application comprises:

a voice recognition module for recognizing the speech;

a voice dialing module for placing a call with the recognized speech;

a speech decomposition module for decomposing the speech into characters; and a character-numeral translation module for translating the characters into corresponding numerals.

10. The voice recognition-enabled mobile phone of claim 5, further comprising a display unit for displaying the translated numerals.

11. The voice recognition-enabled mobile phone of claim 5, further comprising a radio frequency unit for transmitting a call request signal to a radio access network in accordance with dialing the specific phone number.

* * * * *